US012785869B2

(12) United States Patent
Yang

(10) Patent No.: US 12,785,869 B2
(45) Date of Patent: Nov. 3, 2026

(54) POWER CONTROL PARAMETER DETERMINATION METHOD AND COMMUNICATION DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 280 days.

(21) Appl. No.: 18/425,561

(22) Filed: Jan. 29, 2024

(65) Prior Publication Data

US 2024/0171327 A1 May 23, 2024

Related U.S. Application Data

(63) Continuation of application No. PCT/CN2022/108493, filed on Jul. 28, 2022.

(30) Foreign Application Priority Data

Jul. 30, 2021 (CN) ......................... 202110875673.1

(51) Int. Cl.
*H04L 5/00* (2006.01)
*H04B 7/06* (2006.01)
(Continued)

(52) U.S. Cl.
CPC ......... *H04L 5/001* (2013.01); *H04B 7/06968* (2023.05); *H04L 5/0051* (2013.01); *H04W 52/367* (2013.01); *H04W 76/20* (2018.02)

(58) Field of Classification Search
CPC ......... H04L 5/001; H04L 5/0051; H04L 5/00; H04B 7/06968; H04W 52/367;
(Continued)

(56) References Cited

U.S. PATENT DOCUMENTS

2020/0351039 A1 11/2020 Zhou et al.
2020/0413345 A1 12/2020 Yao et al.
(Continued)

FOREIGN PATENT DOCUMENTS

CN 108135028 A 6/2018
CN 112689321 A 4/2021
(Continued)

OTHER PUBLICATIONS

Zte, "Enhancements on Multi-beam Operation", 3GPP TSG WG1 Meeting #105-e, e-Meeting, May 10-27, 2021, R1-2104585.

*Primary Examiner* — Michael A Keller
(74) *Attorney, Agent, or Firm* — The Webb Law Firm

(57) ABSTRACT

A power control parameter determination method includes obtaining, by a communication device, at least one group of component carriers configured by a network side device; obtaining, by the communication device, first common TCI state information activated or indicated by the network side device for a first target component carrier group; and determining, by the communication device, a target power control parameter of each target unit in the first target component carrier group according to the first common TCI state information. The first target component carrier group is a group of component carriers in the at least one group of component carriers. The target unit includes a component carrier and/or a BWP, and one component carrier includes at least one BWP.

20 Claims, 4 Drawing Sheets

(51) Int. Cl.
*H04W 52/36* (2009.01)
*H04W 76/20* (2018.01)

(58) Field of Classification Search
CPC . H04W 76/20; H04W 52/18; H04W 72/0453; H04W 72/0457
See application file for complete search history.

(56) References Cited

U.S. PATENT DOCUMENTS

| | | | | |
|---|---|---|---|---|
| 2021/0126761 | A1* | 4/2021 | Venugopal | H04W 72/0453 |
| 2021/0135801 | A1* | 5/2021 | Zhou | H04W 72/0453 |
| 2021/0168030 | A1* | 6/2021 | Li | H04L 5/0048 |
| 2022/0240178 | A1 | 7/2022 | Yang et al. | |
| 2022/0330167 | A1 | 10/2022 | Chen et al. | |
| 2022/0345283 | A1 | 10/2022 | Matsumura et al. | |

FOREIGN PATENT DOCUMENTS

| | | | | |
|---|---|---|---|---|
| CN | 114731590 | A | 7/2022 | |
| TW | 202101932 | A | 1/2021 | |
| WO | 2021065015 | A1 | 4/2021 | |
| WO | 2021147001 | A1 | 7/2021 | |
| WO | WO-2023006017 | A1 * | 2/2023 | H04W 72/0453 |

* cited by examiner

POWER CONTROL PARAMETER DETERMINATION METHOD AND COMMUNICATION DEVICE

CROSS-REFERENCE TO RELATED APPLICATIONS

This application is a Bypass Continuation application of International Patent Application No. PCT/CN2022/108493, filed Jul. 28, 2022, and claims priority to Chinese Patent Application No. 202110875673.1, filed Jul. 30, 2021, the disclosures of which are hereby incorporated by reference in their entireties.

BACKGROUND OF THE INVENTION

Field of the Invention

This application belongs to the field of wireless communication technologies, and particularly relates to a power control parameter determination method and a communication device.

Description of Related Art

In communication technologies, the unified transmission configuration indicator framework is introduced, that is, the network indicates common beam information by using a media access control (MAC) control element (CE) or downlink control information (DCI). Specific information can be a joint transmission configuration indicator (TCI) state, a separate downlink (DL) TCI state, and a separate uplink (UL) TCI state. Common beam information is used for multiple channels or reference signals. For example, the joint TCI state is used to determine beam information of a user equipment-specific (UE-specific) control channel and data channel, and the separate DL TCI state and the separate UL TCI state are used to determine beam information of a UE-specific downlink and uplink control channel and data channel respectively.

It should be noted that the beam information can also be called: beam identification information, spatial relation information, spatial domain transmission filter information, spatial domain reception filter information, spatial filter information, TCI state information, Quasi co-location (QCL) information or QCL parameters, etc. The downlink beam information may usually be represented by the TCI state information or the QCL information. The uplink beam information may usually be represented by TCI state information or spatial relation information.

SUMMARY OF THE INVENTION

According to a first aspect, a power control parameter determination method is provided, including: obtaining, by a communication device, at least one group of component carriers configured by a network side device; obtaining, by the communication device, first common transmission configuration indicator TCI state information activated or indicated by the network side device for a first target component carrier group, where the first target component carrier group is a group of component carriers in the at least one group of component carriers; and determining, by the communication device, a target power control parameter of each target unit in the first target component carrier group according to the first common TCI state information, where a target unit includes: a component carrier and/or a bandwidth part BWP, and one component carrier includes at least one BWP.

According to a second aspect, a power control parameter determination apparatus is provided, including: a first obtaining module, configured to obtain at least one group of component carriers configured by a network side device; a second obtaining module, configured to obtain first common TCI state information activated or indicated by the network side device for a first target component carrier group, where the first target component carrier group is a group of component carriers in the at least one group of component carriers; and a determination module, configured to determine a target power control parameter of each target unit in the first target component carrier group according to the first common TCI state information, where a target unit includes: a component carrier and/or a BWP, and one component carrier includes at least one BWP.

According to a third aspect, a communication device is provided. The communication device includes a processor, a memory, and a program or an instruction stored in the memory and executable on the processor, where when the program or the instruction is executed by the processor, the steps of the method in the first aspect are implemented.

According to a fourth aspect, a communication device is provided, including a processor and a communication interface, where the processor is configured to implement the steps of the method in the first aspect, and the communication interface is configured to communicate with an external communication device.

According to a fifth aspect, a non-transitory readable storage medium is provided. The non-transitory readable storage medium stores a program or an instruction, and when the program or the instruction is executed by a processor, the steps of the method in the first aspect are implemented.

According to a sixth aspect, a chip is provided. The chip includes a processor and a communication interface, where the communication interface is coupled to the processor, and the processor is configured to run a program or an instruction to implement the steps of the method in the first aspect.

According to a seventh aspect, a computer program/program product is provided, the computer program/program product is stored in a non-transient storage medium, and the program/program product is executed by at least one processor to implement the steps of the method described in the first aspect.

DESCRIPTION OF THE INVENTION

The following clearly describes the technical solutions in embodiments of this application with reference to the accompanying drawings in embodiments of this application. Apparently, the described embodiments are some but not all of embodiments of this application. All other embodiments obtained by a person of ordinary skill in the art based on embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in embodiments of this application are not limited to a long term evolution (LTE)/LTE-Advanced (LTE-A) system, and can also be used in other wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in embodiments of this application are often used interchangeably, and the described technology can be used not only for the systems and radio technologies mentioned above, but also for other systems and radio technologies. However, a new radio (NR) system is described in the following descriptions for illustrative purposes, and the NR terminology is used in most of the following descriptions, although these techniques can also be applied to applications other than the NR system application, for example, the 6th generation (6G) communications system.

Figure 1:
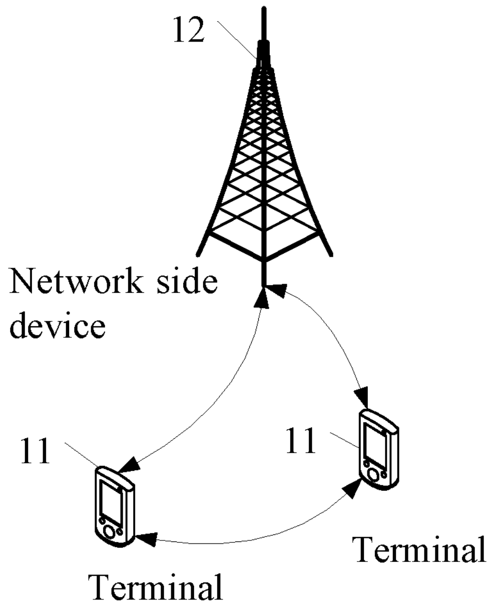
FIG. 1 is a schematic diagram of a wireless communications system to which an embodiment of this application can be applied.

FIG. 1 is a schematic diagram of a wireless communications system to which an embodiment of this application can be applied. The wireless communications system includes a terminal 11 and a network side device 12. The terminal 11 may also be called a terminal device or user equipment, and the terminal 11 may be a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: smart watches, bracelets, earphones, glasses, etc. It should be noted that a type of the terminal 11 is not limited in embodiments of this application. The network side device 12 may be a base station or a core network. The base station may be referred to as an access point, a base transceiver station (BTS), a radio base station, a radio transceiver, a basic service set (BSS), an extended service set (ESS), a node B, an evolved node B (eNB), a home node B, a home evolved node B, a WLAN access point, a Wi-Fi node, a transmitting receiving point (TRP), or other appropriate terms in the art. As long as same technical effect is achieved, the base station is not limited to a specified technical term. It should be noted that, in embodiments of this application, only a base station in the NR system is used as an example, but a type of the base station is not limited.

The technical solutions provided by embodiments of this application will be described in detail below with reference to the accompanying drawings through some embodiments and their application scenarios.

In a carrier aggregation (CA) scenario, for a group of component carriers (CC), the network can indicate a common TCI state identifier. The common TCI state ID is used to determine common QCL information of at least a UE-dedicated physical downlink control channel (PDCCH)/physical downlink shared channel (PDSCH), and/or determine common UL transmission (TX) spatial filter of at least a UE-dedicated physical uplink shared channel (PUSCH)/physical uplink control channel (PUCCH). The group of component carriers include multiple CCs or multiple bandwidth parts (BWP). A source reference signal (RS) in a common TCI state ID indicated for a target CC can be configured on the target CC or other CCs.

However, in the unified TCI framework, a solution to obtain power control parameter information of different CCs in the CA scenario has not yet been given.

Figure 2:
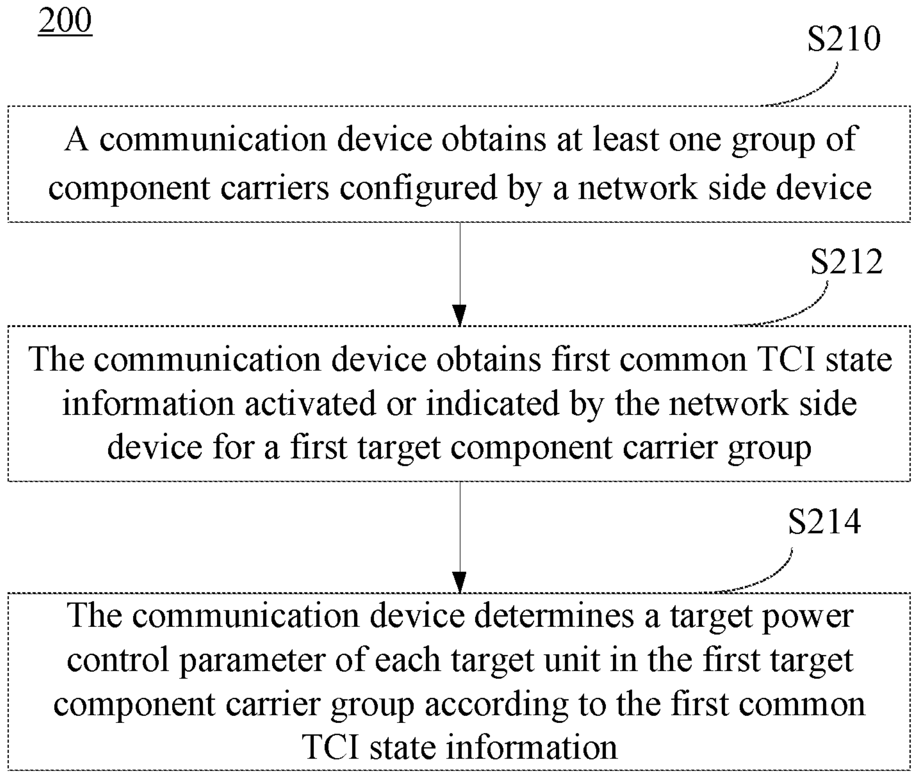
FIG. 2 is a flowchart of a power control parameter determination method according to an embodiment of this application.

FIG. 2 is a schematic flowchart of a power control parameter determination method according to an embodiment of this application. The method 200 can be executed by a communication device. In other words, the method may be performed by software or hardware installed on the communication device. As shown in FIG. 2, the method may include the following steps.

S210: A communication device obtains at least one group of component carriers configured by a network side device.

In this embodiment of this application, the communication device may be a terminal or a network side device. That is, both the terminal and the network side device can use the method from S210 to S214 to obtain the power control parameter of each CC and/or BWP in a group of component carriers to ensure the accuracy of power control.

In an actual application, the network side device can configure at least one group of component carriers (CC). Each group of CCs can also be called a CC list, a CC set, or a CC subset, or called a CC group.

In this embodiment of this application, each group of CCs may include a reference CC and/or a reference BWP, and a TCI state pool may be configured on the reference CC and/or the reference BWP. Other CCs and/or other BWPs in each group of CCs can use the TCI state pool on the reference CC and/or reference BWP in the group.

In a group of CCs, in other CCs and/or other BWPs other than the reference CC and/or the reference BWP, the network side device does not configure a TCI state pool.

In this embodiment of this application, each group of CCs may be intra-band CCs or inter-band CCs.

S212: The communication device obtains first common TCI state information activated or indicated by the network side device for a first target component carrier group, where the first target component carrier group is a group of component carriers in the at least one group of component carriers.

In this embodiment of this application, the network side device may activate or indicate the first common TCI state information for the first target component carrier group; and may determine at least one of a TCI state, QCL information, uplink transmission spatial filter information, or the like on each carrier or BWP in the first target component carrier group according to the first common TCI state information. Correspondingly, the terminal may also determine at least one of the TCI state, QCL information, uplink transmission spatial filter information, or the like on each carrier or BWP in the first target component carrier group according to the first common TCI state information indicated by the network side device.

For example, the terminal can determine at least one of the TCI state, QCL information, or UL Tx spatial filter information of each CC in the first target component carrier group based on the common TCI state identifier (ID) activated or indicated by the network for the first target component carrier group.

In a possible implementation, the first common TCI state information can be used for a target signal, where the target signal includes at least one of the following:

(1) UE-dedicated PDCCH and/or PDSCH;

(2) PUSCH and/or PUCCH;

(3) Non-UE-specific control resource set (CORESET) related channels;

(4) CSI reference signal (CSI-RS); or (5) Sounding reference signal (SRS).

S214: The communication device determines a target power control parameter of each target unit in the first target component carrier group according to the first common TCI state information, where the target unit includes: a component carrier and/or a BWP, and one component carrier includes at least one BWP.

In this embodiment of this application, the target power control parameter may include:

(1) a path loss reference signal (PLRS); and (2) a power control parameter set (PC setting) other than the PLRS, where the power control parameter set other than the PLRS includes at least one of the following:

target received power P0, indicating power expected to reach the base station;

path loss compensation factor α, the value of which determines whether the path loss is fully or partially compensated when calculating power;

close loop index, that is, the closed loop power control process, determining the process identifier of the closed loop power control; or power control adjustment state value, divided into accumulation mode and absolute assignment mode.

In this embodiment, the target power control parameter may be used for at least one of a PUCCH, a PUSCH, or an SRS on the target unit.

In the above technical solution provided by this embodiment of this application, the communication device obtains at least one group of component carriers configured by the network side device, and for the first target component carrier group, obtains the first common TCI state information activated or indicated by the network side device for the first target component carrier group, and then determines the target power control parameter of each CC and/or BWP in the first target component carrier group according to the first common TCI state information, so that the power control parameter information of different CCs can be obtained under a unified TCI framework. This ensures the accuracy of power control in CA scenarios.

In a first possible implementation manner, in S214, the determining, by the communication device, the target power control parameter of each target unit in the first target component carrier group according to the first common TCI state information may include:

in a case that the first common TCI state information includes a first power control parameter identifier, or the first common TCI state information is associated with a first power control parameter identifier, setting the target power control parameter of each target unit in the first target component carrier group to a common power control parameter corresponding to the first power control parameter identifier.

For example, when a PLRS ID is included in the common TCI state, or the common TCI state is associated with a PLRS ID, or a PLRS ID is included in the common TCI state ID, or the common TCI state ID is associated with a PLRS ID, a common PLRS corresponding to the included or associated PLRS ID is used for all CCs in the group.

For another example, when a PC setting ID is included in the common TCI state, or the common TCI state is associated with a PC setting ID, or a PC setting ID is included in the common TCI state ID, or the common TCI state ID is associated with a PC setting ID, a common PC setting corresponding to the included or associated PC setting ID is used for all CCs in the group.

In the above possible implementation, the network device determines the power control parameter information through explicit configuration, for example, configures the PLRS ID and/or PC setting ID in the common TCI state information, or configures that the common TCI state information is associated with the PLRS ID and/or PC setting ID.

In particular, the UE capability can support beam misalignment, that is, the beam information indicated by the common TCI state is inconsistent with the beam information of the PLRS, or the QCL-TypeD source RS in the common TCI state is different from the PLRS or is not QCLed. At this time, the network device can explicitly configure a PLRS different from the QCL-TypeD source RS in the common TCI state.

In the above possible implementation manner, the common power control parameter is a power control parameter on a reference target unit in the first target component carrier group, or the common power control parameter is a power control parameter on a preset target unit in the first target component carrier group.

For example, the common PLRS included or associated with the common TCI state ID is the RS on the reference CC and/or the reference BWP in the group of CCs or the RS on a certain preset CC/BWP. For example, the group of CCs includes CC0, CC1, CC2, and CC3. The reference CC is CC0. The PLRS on CC0 is determined based on the PLRS ID, and the PLRS is used as the PLRS on these four CCs.

In the above possible implementation manner, optionally, the setting the target power control parameter of each target unit in the first target component carrier group to a common power control parameter corresponding to the first power control parameter identifier includes:

in a case that it is determined based on the first common TCI state information that a QCL-typeD reference signal on each target unit in the first target component carrier group is a common QCL-typeD source reference signal, setting the target power control parameter of each target unit in the first target component carrier group to the common power control parameter corresponding to the first power control parameter identifier.

For example, when the QCL-TypeD RS on each CC and/or BWP determined according to the common TCI state ID is a common QCL-TypeD source RS, the target power control parameter of each target unit in the first target component carrier group is set to a common power control parameter corresponding to the first power control parameter identifier. The QCL-TypeD RS on each CC and/or BWP determined according to the common TCI state ID is a common QCL-TypeD source RS, that is, a source RS in the common TCI state ID crosses CCs, that is, the source RS is used for all target CCs. In this case, the target power control parameter of each target unit in the first target component carrier group is also determined in a similar manner, that is, each target unit shares the same target power control parameter.

In a second possible implementation manner, in S214, the determining, by the communication device, the target power control parameter of each target unit in the first target component carrier group according to the first common TCI state information may include:

in a case that the first common TCI state information includes a first power control parameter identifier, or the first common TCI state information is associated with a first power control parameter identifier, determining the target power control parameter of each target unit in the first target component carrier group according to the first power control parameter identifier.

For example, when the PLRS ID is included in the common TCI state, the common TCI state is associated with the PLRS ID, or the PLRS ID is included in the common TCI state ID, or the common TCI state ID is associated with the PLRS ID, on each CC of the first target component carrier group, the PLRS on each CC/BWP is determined according to the PLRS ID.

For another example, when a PC setting ID is included in the common TCI state, or the common TCI state is associated with a PC setting ID, a PC setting ID is included in the common TCI state ID, or the common TCI state ID is associated with a PC setting ID, a common PC setting corresponding to the included or associated PC setting ID is used for all CCs in the group.

In the above possible implementation, the network device determines the power control parameter information through explicit configuration, for example, configures the PLRS ID and/or PC setting ID in the common TCI state information, or configures that the common TCI state information is associated with the PLRS ID and/or PC setting ID.

In particular, the UE capability can support beam misalignment, that is, the beam information indicated by the common TCI state is inconsistent with the beam information of the PLRS, or the QCL-type source RS in the common TCI state is different from the PLRS or is not QCLed. At this time, the network device can explicitly configure a PLRS different from the QCL-TypeD source RS in the common TCI state.

In the above possible implementation manner, target power control parameters of target units are not exactly the same, and the target power control parameters of the target units are QCLed. For example, the PLRS on each CC/BWP can be different, but is QCLed. The PLRS on one CC/BWP is the QCL source RS of the PLRS on another CC/BWP, or the PLRS on these CCs/BWPs have a common QCL source RS. For example, the group of CCs includes CC0, CC1, CC2, and CC3. The PLRS on CC0 is RS0 corresponding to the PLRS ID, the PLRS on CC1 is the RSI corresponding to the PLRS ID, the PLRS on CC2 is the RS2 corresponding to the PLRS ID, and the PLRS on CC3 is PLRS is RS3 corresponding to PLRS ID. These four RSs are QCLed. For example, RS0 is the QCL source RS of RS1, RS2, and RS3, or these four RSs have a common QCL source RS (such as SSB).

In the above possible implementation manner, optionally, target power control parameters of target units are not exactly the same, and the target power control parameters of the target units are not all QCLed. For example, the PLRS on each CC/BWP can be different, and not all are QCLed.

In the above possible implementation manner, the determining the target power control parameter of each target unit in the first target component carrier group according to the first power control parameter identifier includes:

in a case that the QCL-typeD source reference signal on each target unit in the first target component carrier group is determined according to the first common TCI state information, determining the target power control parameter of each target unit in the first target component carrier group according to the first power control parameter identifier.

For example, if the QCL-TypeD RS on each CC/BWP determined based on the common TCI state ID is a different QCL-TypeD source RS, the power control parameter on each CC/BWP is determined in a similar manner. For example, the target power control parameter on each CC/BWP is determined based on the included or associated power control parameter identifier.

In an actual application, the first possible implementation manner and the second possible implementation manner are combined, for example, whether to use the first possible implementation manner or the second possible implementation manner is determined according to whether the QCL-typeD source reference signal of each target unit in the first target component carrier group determined according to the first common TCI state information is a common QCL-typeD source reference signal or whether the QCL-typeD source reference signal of each target unit in the first target component carrier group is determined separately.

For example, whether to use the first possible implementation manner or the second possible implementation manner for the power control parameter on each CC/BWP is determined based on whether the QCL-TypeD RSs on CCs/BWPs determined according to the common TCI state ID are a common QCL-TypeD source RS or different QCL-TypeD source RSs. That is, the same determination method as the beam information is used for the power control parameter information of each CC/BWP.

In another possible implementation manner, in S214, the determining, by the communication device, the target power control parameter of each target unit in the first target component carrier group according to the first common TCI state information includes:

in a case that the first common TCI state information includes multiple first power control parameter identifiers or the first common TCI state information is associated with multiple first power control parameter identifiers, and a number of the multiple first power control parameter identifiers is the same as a number of target units in the first target component carrier group, determining the target power control parameter of each target unit according to the first power control parameter identifier corresponding to the target unit, where each target unit corresponds one-to-one to one first power control parameter according to a preset arrangement order or a preset position.

For example, the PLRS ID is included in the common TCI state, or the common TCI state is associated with the PLRS ID, the common TCI state ID includes the PLRS ID, or the common TCI state ID is associated with the PLRS ID. The number of the PLRS IDs is the same as that of CCs/BWPs in the group of CCs/BWPs. In this case, the PLRS ID and CC/BWP correspond to each other according to the preset arrangement or position.

For another example, when a PC setting ID is included in the common TCI state, or the common TCI state is associated with a PC setting ID, or a PC setting ID is included in the common TCI state ID, or the common TCI state ID is associated with a PC setting ID. The number of the PLRS setting IDs is the same as that of CCs/BWPs in the group of CCs/BWPs. In this case, the PLRS setting ID and CC/BWP correspond to each other according to the preset arrangement or position.

In another possible implementation manner, in S214, the determining, by the communication device, the target power control parameter of each target unit in the first target component carrier group according to the first common TCI state information may include:

in a case that the first common TCI state information does not include the first power control parameter identifier, and the first common TCI state information is not associated with the first power control parameter identifier, determining a QCL-typeD reference signal of each target unit in the first target component carrier group according to the first common TCI information, and using the QCL-typeD reference signal of each target unit as the PLRS of the target unit; and/or in a case that the first common TCI state information does not include the first power control parameter identifier, and the first common TCI state information is not associated with the first power control parameter identifier, indicating by the network side device the power control parameter set other than the PLRS, or determining the power control parameter set other than the PLRS according to an agreement.

In the above possible implementation, the network device determines the power control parameter information through implicit configuration. For example, the QCL-TypeD source RS of the common TCI state information is used as the PLRS, and the default value agreed upon by the protocol is used as each power control parameter value in the PC setting, or the network device indicates the PLRS and the power control parameter in the PC setting under implicit configuration.

In particular, the UE capability cannot support beam misalignment, that is, the beam information indicated by the common TCI state must be consistent with the beam information of the PLRS, or the QCL-type source RS in the common TCI state is the same as the PLRS or is QCLed. In this case, the network device does not need to explicitly configure the PLRS, and instead can directly use, as the PLRS, the QCL-typeD source RS determined based on common TCI state information.

For example, the PLRS ID is not included in the common TCI state, or the common TCI state is not associated with the PLRS ID, or the PLRS ID is not included in the common TCI state ID, and is not associated with the common TCI state ID. The QCL-TypeD RS of each CC/BWP in the group of CCs/BWPs determined based on the common TCI state ID is used as the PLRS of each CC/BWP.

For another example, when the PC setting ID is not included in the common TCI state, or the common TCI state is not associated with the PC setting ID, the PC setting ID is not included in the common TCI state ID, or the common TCI state ID is not associated with the PC setting ID, the default value agreed upon by the protocol or the default value indicated by the network is used as each parameter value in the PC setting of each CC/BWP in the group of CC s/BWPs.

In each of the above possible implementations, that the first common TCI state information includes a first power control parameter identifier includes: the first common TCI state information includes the first common TCI state identifier, and the first common TCI state identifier includes the first power control parameter identifier, that is, one parameter in the first common TCI state information is the first common TCI state identifier, and the identifier includes the first power control parameter identifier; or the first common TCI state information includes the first power control parameter identifier, that is, the first common TCI state includes a parameter of a power control parameter identifier, and the value of the parameter is the first power control parameter identifier.

In each of the above possible implementations, correspondingly, that the first common TCI state information is associated with a first power control parameter identifier includes: the first common TCI state information includes a first common TCI state identifier, and the first common TCI state identifier is associated with the first power control parameter identifier; or the first common TCI state information is associated with the first power control parameter identifier.

In a possible implementation, the method may further include: obtaining, by the communication device, second common TCI state information activated or indicated by the network side device for a second target component carrier group, where the first common TCI state information and the second common TCI state information are different common TCI state information, the second common TCI state information includes a second power control parameter identifier, or the second common TCI state information is associated with a second power control parameter identifier, and the second target component carrier group is a group of component carriers in the at least one group of component carriers other than the first target component carrier group; and determining a target power control parameter of each target unit in the second target component carrier group according to the second common TCI state information.

In the above possible implementation manner, optionally, the communication device can determine the target power control parameter of each target unit in the second target component carrier group in the same manner as that for determining the target power control parameter of each target unit in the first target component carrier group. In this case, the first common TCI state information and the second common TCI state information may be the same or different, and the network side device may indicate or activate the common TCI state information of the first target component carrier group and the second target component carrier group respectively, and configure the power control parameter identifiers included in or associated with the first common TCI state information and the second common TCI state information respectively.

For example, the network independently indicates the common TCI state ID for each group of CCs, and also independently configures the PLRS for each group of CCs according to the method in the above steps. The relationship between the common TCI state ID and the PLRS ID is described as above, that is, the common TCI state includes or is associated with the PLRS ID, or the common TCI state ID includes or is associated with the PLRS ID. For example, the first group of CCs uses common TCI state 1, which includes PLRS 1, and the second group of CCs uses common TCI state 2, which includes PLRS2.

Optionally, the first power control parameter identifier and the second power control parameter identifier are the same. In this case, the network side device can independently indicate the common TCI state information of each group of component carriers and uniformly configure the power control parameter identifier included in or associated with the common TCI state information of each group of component carriers. For example, the network independently indicates the common TCI state ID for each group of CCs, but the PLRS ID is the same.

In the possible implementation manner, the target power control parameter of each target unit in each of the first target component carrier group and the second target component carrier group is a same common power control parameter, or the target power control parameter of each target unit in each component carrier group is separately determined.

Optionally, the target power control parameter of each target unit in the first target component carrier group and the target power control parameter of each target unit in the second target component carrier group are a same common power control parameter.

For example, in each group of CCs/BWPs, the PLRS of each CC/BWP can be a common PLRS, or a different PLRS but is QCLed. In each group of CCs, the PLRS of each CC/BWP can also be a common PLRS, or a different PLRS but is QCLed.

For another example, in each group of CCs/BWPs, the power control parameter in the PC setting of each CC/BWP can be the same power control parameter. In each group of CCs, the power control parameter in the PC setting of each CC/BWP can also be the same.

In a possible implementation manner, the first common TCI state information is used for the at least one group of component carriers. For example, the common TCI state ID of each group of CCs is the same, that is, the common TCI state ID indicated by the network is used for multiple groups of CCs.

In the possible implementation manner, optionally, the first common TCI state information includes or is associated with multiple power control parameter identifiers, each of the power control parameter identifiers corresponds to target units in a group of component carriers, or each of the power control parameter identifiers corresponds to one target unit in the at least one group of component carriers.

For example, the PLRS ID included in or associated with the common TCI state, or the PLRS ID included in or associated with the common TCI state ID respectively corresponds to each group of CCs/BWPs, or corresponds to each CC/BWP. According to the preset arrangement or position, the PLRS ID corresponds to each group of CCs/BWPs or each CC/BWP. If the PLRS ID corresponds to each group of CCs/BWPs, each CC/BWP in the group of CCs/BWPs corresponds to the same PLRS ID.

For another example, the PC setting ID included in or associated with the common TCI state, or the PC setting ID included in or associated with the common TCI state ID respectively corresponds to each group of CCs/BWPs, or corresponds to each CC/BWP. According to the preset arrangement or position, the PC setting ID corresponds to each group of CCs/BWPs or each CC/BWP. If the PC setting ID corresponds to each group of CCs/BWPs, each CC/BWP in the group of CCs/BWPs corresponds to the same PC setting ID.

In the possible implementation manner, optionally, the first common TCI state information includes or is associated with a power control parameter identifier, and target units of each group of component carriers correspond to the power control parameter identifier.

For example, the network indicates the same common TCI state ID for each group of CCs, and the PLRS ID included in or associated with the common TCI state information is also the same, that is, the PLRS ID is used for each CC/BWP in each group of CCs.

Through the technical solution provided by embodiments of this application, when the network side device indicates the common TCI state in the CA scenario, the power control parameter on each CC is determined based on the power control parameter information included in or associated with the common TCI state, so that the network and UE can correctly determine the power control parameter on each CC in the CA scenario to ensure the accuracy of power control.

It should be noted that, the power control parameter determination method provided by the embodiment of this application may be a power control parameter determination apparatus, or a control module in the power control parameter determination apparatus configured to execute the power control parameter determination method. In the embodiment of this application, the power control parameter determination apparatus provided in the embodiment of this application is described by taking the power control parameter determination method being performed by the power control parameter determination apparatus as an example.

Figure 3:
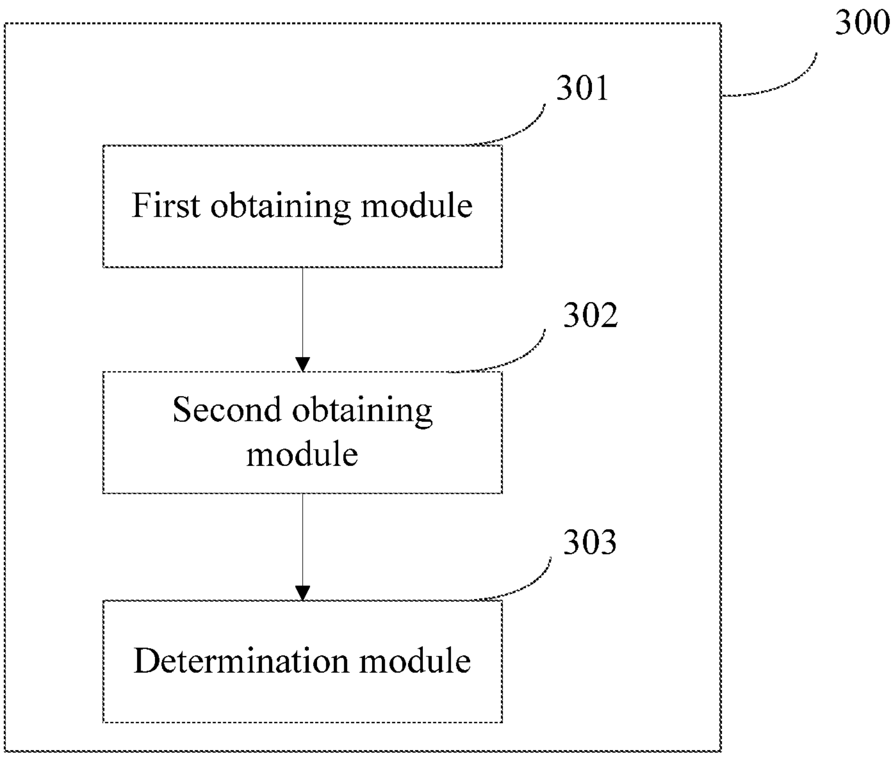
FIG. 3 is a schematic structural diagram of a power control parameter determination apparatus according to an embodiment of this application.

FIG. 3 is a power control parameter determination apparatus provided by an embodiment of this application. As shown in FIG. 3, the apparatus 300 mainly includes: a first obtaining module 301, a second obtaining module 302, and a determination module 303.

In this embodiment of this application, the first obtaining module 301 is configured to obtain at least one group of component carriers configured by a network side device; the second obtaining module 302 is configured to obtain first common transmission configuration indicator TCI state information activated or indicated by the network side device for a first target component carrier group, where the first target component carrier group is a group of component carriers in the at least one group of component carriers; and the determination module 303 is configured to determine a target power control parameter of each target unit in the first target component carrier group according to the first common TCI state information, where the target unit includes: a component carrier and/or a bandwidth part BWP, and one component carrier includes at least one BWP.

In a possible implementation manner, determining, by the determination module 303, the target power control parameter of each target unit in the first target component carrier group according to the first common TCI state information includes:

in a case that the first common TCI state information includes a first power control parameter identifier, or the first common TCI state information is associated with a first power control parameter identifier, setting the target power control parameter of each target unit in the first target component carrier group to a common power control parameter corresponding to the first power control parameter identifier.

In a possible implementation manner, the common power control parameter is a power control parameter on a reference target unit in the first target component carrier group, or the common power control parameter is a power control parameter on a preset target unit in the first target component carrier group.

In a possible implementation manner, setting, by the determination module 303, the target power control parameter of each target unit in the first target component carrier group to the common power control parameter corresponding to the first power control parameter identifier includes:

in a case that it is determined based on the first common TCI state information that a QCL-typeD reference signal on each target unit in the first target component carrier group is a common QCL-typeD source reference signal, setting the target power control parameter of each target unit in the first target component carrier group to the common power control parameter corresponding to the first power control parameter identifier.

In a possible implementation manner, determining, by the determination module 303, the target power control parameter of each target unit in the first target component carrier group according to the first common TCI state information includes:

in a case that the first common TCI state information includes a first power control parameter identifier, or the first common TCI state information is associated with a first power control parameter identifier, determining the target power control parameter of each target unit in the first target component carrier group according to the first power control parameter identifier.

In a possible implementation manner, the target power control parameters of target units are not exactly the same, and the target power control parameters of the target units are quasi-co-located QCLed.

In a possible implementation manner, the target power control parameters of the target units are not exactly the same, and the target power control parameters of the target units are not all quasi-co-located QCLed.

In a possible implementation manner, determining, by the determination module 303, the target power control parameter of each target unit in the first target component carrier group according to the first power control parameter identifier includes:

in a case that the QCL-typeD source reference signal on each target unit in the first target component carrier group is determined according to the first common TCI state information, determining the target power control parameter of each target unit in the first target component carrier group according to the first power control parameter identifier.

In a possible implementation manner, determining, by the determination module 303, the target power control parameter of each target unit in the first target component carrier group according to the first common TCI state information includes:

in a case that the first common TCI state information includes multiple first power control parameter identifiers or the first common TCI state information is associated with multiple first power control parameter identifiers, and a number of the multiple first power control parameter identifiers is the same as a number of target units in the first target component carrier group, determining the target power control parameter of each target unit according to the first power control parameter identifier corresponding to the target unit, where each target unit corresponds one-to-one to one first power control parameter according to a preset arrangement order or a preset position.

In a possible implementation, that the first common TCI state information includes a first power control parameter identifier includes:

the first common TCI state information includes a first common TCI state identifier, and the first common TCI state identifier includes the first power control parameter identifier; or the first common TCI state information includes the first power control parameter identifier; and that the first common TCI state information is associated with the first power control parameter identifier includes:

the first common TCI state information includes a first common TCI state identifier, and the first common TCI state identifier is associated with the first power control parameter identifier; or the first common TCI state information is associated with the first power control parameter identifier.

In a possible implementation, the second obtaining module 302 is further configured to obtain second common TCI state information activated or indicated by the network side device for a second target component carrier group, where the first common TCI state information and the second common TCI state information are different common TCI state information, the second common TCI state information includes a second power control parameter identifier, or the second common TCI state information is associated with a second power control parameter identifier, and the second target component carrier group is a group of component carriers in the at least one group of component carriers other than the first target component carrier group; and the determination module 303 is further configured to determine a target power control parameter of each target unit in the second target component carrier group according to the second common TCI state information.

In a possible implementation, the first power control parameter identifier and the second power control parameter identifier are the same.

In a possible implementation manner, the target power control parameter of each target unit in each of the first target component carrier group and the second target component carrier group is a same common power control parameter, or the target power control parameter of each target unit in each component carrier group is separately determined.

In a possible implementation manner, the target power control parameter of each target unit in the first target component carrier group and the target power control parameter of each target unit in the second target component carrier group are a same common power control parameter.

In a possible implementation manner, the first common TCI state information is used for the at least one group of component carriers.

In a possible implementation manner, the first common TCI state information includes or is associated with multiple power control parameter identifiers, each of the power control parameter identifiers corresponds to target units in a group of component carriers, or each of the power control parameter identifiers corresponds to one target unit in the at least one group of component carriers.

In a possible implementation manner, the first common TCI state information includes or is associated with a power control parameter identifier, and target units of each group of component carriers correspond to the power control parameter identifier.

In a possible implementation manner, the target power control parameter includes:

a path loss reference signal PLRS; and a power control parameter set other than the PLRS, where the power control parameter set other than the PLRS includes at least one of the following: target received power, a path loss compensation factor, a closed loop index, or a power control adjustment state value.

In a possible implementation manner, determining, by the determination module 303, the target power control parameter of each target unit in the first target component carrier group according to the first common TCI state information includes:

in a case that the first common TCI state information does not include the first power control parameter identifier, and the first common TCI state information is not associated with the first power control parameter identifier, determining a QCL-typeD reference signal of each target unit in the first target component carrier group according to the first common TCI information, and using the QCL-typeD reference signal of each target unit as the PLRS of the target unit; and/or in a case that the first common TCI state information does not include the first power control parameter identifier, and the first common TCI state information is not associated with the first power control parameter identifier, indicating by the network side device the power control parameter set other than the PLRS, or determining the power control parameter set other than the PLRS according to an agreement.

The power control parameter determination apparatus in embodiments of this application may be an apparatus, or may be a component, an integrated circuit, or a chip in a terminal or a network side device. The apparatus may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not limited in this embodiment of this application.

The power control parameter determination apparatus in the embodiment of this application may be an apparatus with an operating system. The operating system may be an Android operating system, an iOS operating system, or another possible operating system, which is not limited in embodiments of this application.

The power control parameter determination apparatus provided in the embodiment of this application can realize each process realized by the method embodiment in FIG. 2 and achieve the same technical effect. To avoid repetition, details are not repeated here.

Figure 4:
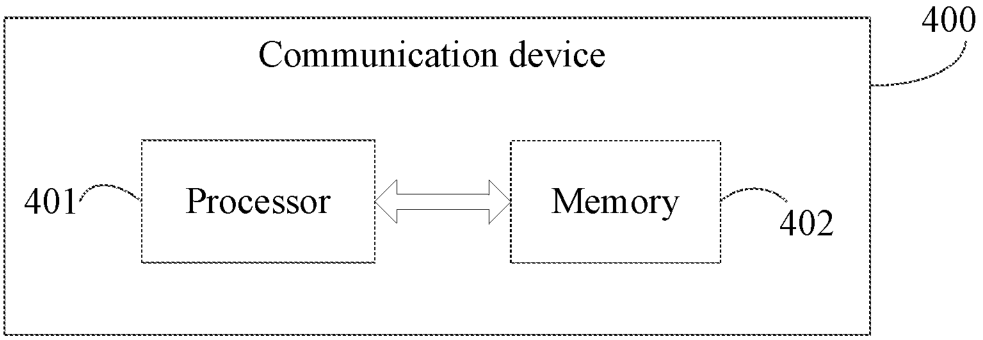
FIG. 4 is a schematic diagram of a structure of a communications device according to an embodiment of this application.

Optionally, as shown in FIG. 4, an embodiment of this application further provides a communication device 400, including a processor 401, a memory 402, and a program or an instruction stored in the memory 402 and executable on the processor 401. For example, when the communication device 400 is a terminal, when the program or instruction is executed by the processor 401, each process of the embodiment of the foregoing power control parameter determination method is performed, and the same technical effect can be achieved. When the communication device 400 is a network side device, when the program or instruction is executed by the processor 401, each process of the above embodiment of the power control parameter determination method is performed, and the same technical effect can be achieved. To avoid repetition, details are not repeated herein.

Figure 5:
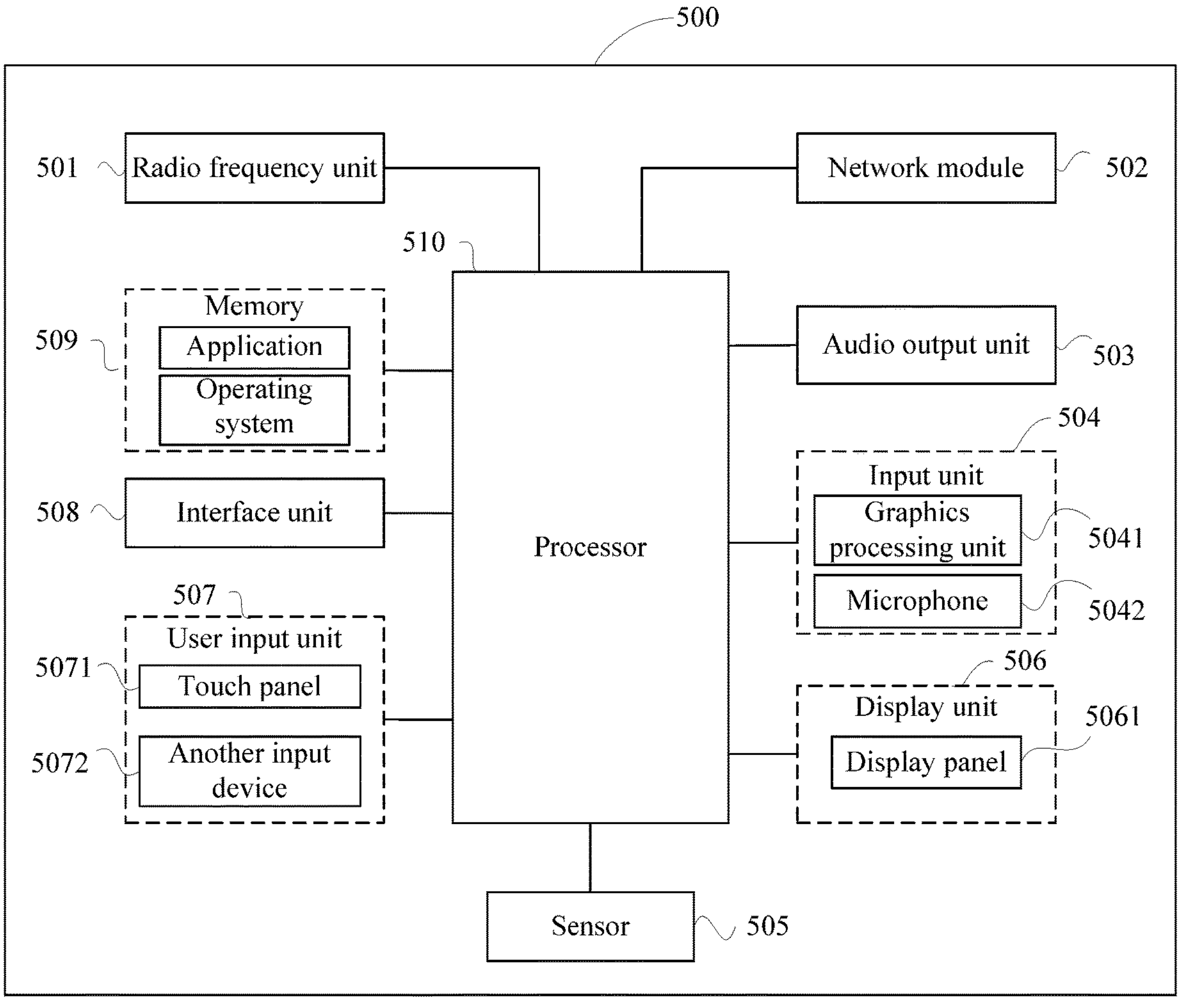
FIG. 5 is a schematic diagram of a hardware structure of a terminal according to an embodiment of this application.

An embodiment of this application also provides a terminal, including a processor and a communication interface. The processor is configured to implement each process of the above embodiment of the power control parameter determination method, and the communication interface is configured to communicate with an external communication device. This terminal embodiment corresponds to the above-mentioned communication device method embodiment. Each implementation process and implementation manner of the above-mentioned method embodiment can be applied to this terminal embodiment, and can achieve the same technical effect. For example, FIG. 5 is a schematic diagram of a hardware structure of a terminal according to an embodiment of this application.

The terminal 500 includes, but is not limited to: a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the terminal 500 may further include a power supply (such as a battery) that supplies power to each component. The power supply may be logically connected to the processor 510 by using a power supply management system, to implement functions such as charging and discharging management, and power consumption management by using the power supply management system. The terminal structure shown in FIG. 5 constitutes no limitation on the terminal, and the terminal may include more or fewer components than those shown in the figure, or combine some components, or have different component arrangements. Details are not described herein.

It should be understood that, in embodiments of this application, the input unit 504 may include a graphics processing unit (GPU) 5041 and a microphone 5042, and the graphics processing unit 5041 processes image data of a still picture or video obtained by an image capture apparatus (such as a camera) in a video capture mode or an image capture mode. The display unit 506 may include a display panel 5061. Optionally, the display panel 5061 may be configured in a form such as a liquid crystal display or an organic light-emitting diode. The user input unit 507 includes a touch panel 5071 and another input device 5072. The touch panel 5071 is also referred to as a touchscreen. The touch panel 5071 may include two parts: a touch detection apparatus and a touch controller. The another input device 5072 may include but is not limited to a physical keyboard, a functional button (such as a volume control button or a power on/off button), a trackball, a mouse, and a joystick. Details are not described herein.

In this embodiment of this application, the radio frequency unit 501 receives downlink data from a network side device and then sends the downlink data to the processor 510 for processing; and sends uplink data to the network side device. Usually, the radio frequency unit 501 includes but is not limited to an antenna, at least one amplifier, a transceiver, a coupler, a low noise amplifier, a duplexer, and the like.

The memory 509 may be configured to store a software program or an instruction and various data. The memory 509 may mainly include a program or instruction storage area and a data storage area. The program or instruction storage area may store an operating system, and an application or an instruction required by at least one function (for example, a sound playing function or an image playing function). In addition, the memory 509 may include a high-speed random access memory and non-transient memory. The non-transient memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-transient solid-state storage component.

The processor 510 may include one or more processing units. Optionally, an application processor and a modem processor may be integrated into the processor 510. The application processor mainly processes an operating system, a user interface, an application, an instruction, or the like. The modem processor mainly processes wireless communication, for example, a baseband processor. It can be understood that, alternatively, the modem processor may not be integrated into the processor 510. The processor 510 is configured to: obtain at least one group of component carriers configured by a network side device;

obtain first common transmission configuration indicator TCI state information activated or indicated by the network side device for a first target component carrier group, where the first target component carrier group is a group of component carriers in the at least one group of component carriers; and determine a target power control parameter of each target unit in the first target component carrier group according to the first common TCI state information, where the target unit includes: a component carrier and/or a bandwidth part BWP, and one component carrier includes at least one BWP.

An embodiment of this application also provides a network side device, including a processor and a communication interface. The processor is configured to implement each process of the above embodiment of the power control parameter determination method, and the communication interface is configured to communicate with an external communication device. This embodiment of the network side device corresponds to the above-mentioned method embodiment on the communication device, and each implementation process and implementation manner of the above-mentioned method embodiment can be applied to this embodiment of the network side device, and can achieve the same technical effect.

Figure 6:
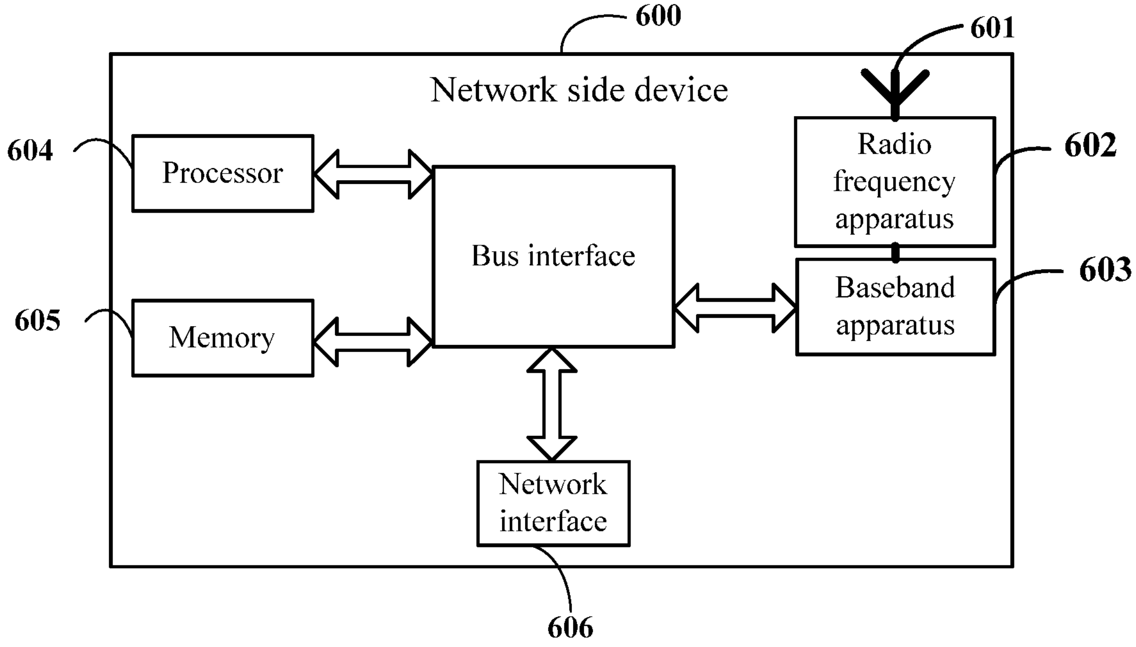
FIG. 6 is a schematic diagram of a hardware structure of a network side device according to an embodiment of this application.

For example, an embodiment of this application further provides a network side device. As shown in FIG. 6, a network device 600 includes an antenna 601, a radio frequency apparatus 602, and a baseband apparatus 603. The antenna 601 is connected to the radio frequency apparatus 602. In an uplink direction, the radio frequency apparatus 602 receives information by using the antenna 601, and sends the received information to the baseband apparatus 603 for processing. In a downlink direction, the baseband apparatus 603 processes information that needs to be sent, and sends processed information to the radio frequency apparatus 602. The radio frequency apparatus 602 processes the received information, and sends processed information by using the antenna 601.

The frequency band processing apparatus may be located in the baseband apparatus 603. The method performed by the network side device in the foregoing embodiment may be implemented in the baseband apparatus 603. The baseband apparatus 603 includes a processor 604 and a memory 605.

The baseband apparatus 603 may include, for example, at least one baseband board, where a plurality of chips are disposed on the baseband board. As shown in FIG. 6, one chip is, for example, the processor 604, which is connected to the memory 605, to invoke a program in the memory 605 to perform operations of the network device shown in the foregoing method embodiment.

The baseband apparatus 603 may further include a network interface 606, configured to exchange information with the radio frequency apparatus 602. For example, the interface is a common public radio interface (CPRI).

For example, the network side device in this embodiment of the present application further includes an instruction or a program stored in the memory 605 and executable on the processor 604. The processor 604 invokes the instruction or the program in the memory 605 to perform the method performed by the modules shown in FIG. 3, and same technical effect is achieved. To avoid repetition, details are not described herein again.

An embodiment of this application further provides a non-transitory readable storage medium. The non-transitory readable storage medium stores a program or an instruction, and when the program or the instruction is executed by a processor, the various processes of the foregoing embodiment of the power control parameter determination method are performed and the same technical effects can be achieved. To avoid repetition, details are not described herein again.

The processor is a processor in the terminal in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip, the chip includes a processor and a communication interface, the communication interface is coupled to the processor, and the processor is configured to run a program or instructions to implement each process of the embodiment of the foregoing power control parameter determination method and the same technical effects can be achieved. To avoid repetition, details are not described herein again.

It should be understood that the chip mentioned in this embodiment of this application may also be referred to as a system-level chip, a system chip, a chip system, or an on-chip system chip.

Embodiments of this application further provide a computer program/program product, the computer program/program product is stored in a non-transient storage medium, and the program/program product is executed by at least one processor to implement the various processes of embodiments of the power control parameter determination method, and the same technical effects can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in embodiments of this application.

Embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A power control parameter determination method, comprising:

obtaining, by a communication device, at least one group of component carriers configured by a network side device;

obtaining, by the communication device, first common transmission configuration indicator (TCI) state information activated or indicated by the network side device for a first target component carrier group, wherein the first target component carrier group is a group of component carriers in the at least one group of component carriers; and determining, by the communication device, a target power control parameter of each target unit in the first target component carrier group according to the first common TCI state information, wherein a target unit comprises: a component carrier and/or a bandwidth part (BWP), and one component carrier comprises at least one BWP.

2. The method according to claim 1, wherein the determining, by the communication device, a target power control parameter of each target unit in the first target component carrier group according to the first common TCI state information comprises:

in a case that the first common TCI state information comprises a first power control parameter identifier, or the first common TCI state information is associated with the first power control parameter identifier, setting the target power control parameter of each target unit in the first target component carrier group to a common power control parameter corresponding to the first power control parameter identifier.

3. The method according to claim 2, wherein the common power control parameter is a power control parameter on a reference target unit in the first target component carrier group, or the common power control parameter is a power control parameter on a preset target unit in the first target component carrier group.

4. The method according to claim 2, wherein the setting the target power control parameter of each target unit in the first target component carrier group to a common power control parameter corresponding to the first power control parameter identifier comprises:

in a case that it is determined based on the first common TCI state information that a quasi co-location typeD (QCL-typeD) reference signal on each target unit in the first target component carrier group is a common QCL-typeD source reference signal, setting the target power control parameter of each target unit in the first target component carrier group to the common power control parameter corresponding to the first power control parameter identifier.

5. The method according to claim 1, wherein the determining, by the communication device, a target power control parameter of each target unit in the first target component carrier group according to the first common TCI state information comprises:

in a case that the first common TCI state information comprises a first power control parameter identifier, or the first common TCI state information is associated with the first power control parameter identifier, determining the target power control parameter of each target unit in the first target component carrier group according to the first power control parameter identifier.

6. The method according to claim 5, wherein target power control parameters of target units are not exactly same, and the target power control parameters of the target units are quasi-co-located (QCLed);

or target power control parameters of target units are not exactly same, and the target power control parameters of the target units are not all QCLed.

7. The method according to claim 5, wherein the determining the target power control parameter of each target unit in the first target component carrier group according to the first power control parameter identifier comprises:

in a case that a quasi co-location typeD (QCL-typeD) source reference signal on each target unit in the first target component carrier group is determined according to the first common TCI state information, determining the target power control parameter of each target unit in the first target component carrier group according to the first power control parameter identifier.

8. The method according to claim 1, wherein the determining, by the communication device, a target power control parameter of each target unit in the first target component carrier group according to the first common TCI state information comprises:

in a case that the first common TCI state information comprises multiple first power control parameter identifiers or the first common TCI state information is associated with the multiple first power control parameter identifiers, and a number of the multiple first power control parameter identifiers is same as a number of target units in the first target component carrier group, determining the target power control parameter of each target unit according to a first power control parameter identifier corresponding to the target unit, wherein each target unit corresponds one-to-one to one first power control parameter according to a preset arrangement order or a preset position.

9. The method according to claim 2, wherein that the first common TCI state information comprises the first power control parameter identifier comprises:

the first common TCI state information comprises a first common TCI state identifier, and the first common TCI state identifier comprises the first power control parameter identifier; or the first common TCI state information comprises the first power control parameter identifier; and that the first common TCI state information is associated with the first power control parameter identifier comprises:

the first common TCI state information comprises a first common TCI state identifier, and the first common TCI state identifier is associated with the first power control parameter identifier; or the first common TCI state information is associated with the first power control parameter identifier.

10. The method according to claim 2, wherein the method further comprises:

obtaining, by the communication device, second common TCI state information activated or indicated by the network side device for a second target component carrier group, wherein the first common TCI state information and the second common TCI state information are different common TCI state information, the second common TCI state information comprises a second power control parameter identifier, or the second common TCI state information is associated with the second power control parameter identifier, and the second target component carrier group is a group of component carriers in the at least one group of component carriers other than the first target component carrier group; and determining a target power control parameter of each target unit in the second target component carrier group according to the second common TCI state information.

11. The method according to claim 10, wherein the first power control parameter identifier and the second power control parameter identifier are same.

12. The method according to claim 11, wherein the target power control parameter of each target unit in each of the first target component carrier group and the second target component carrier group is a same common power control parameter, or the target power control parameter of each target unit in each component carrier group is separately determined.

13. The method according to claim 11, wherein the target power control parameter of each target unit in the first target component carrier group and the target power control parameter of each target unit in the second target component carrier group are a same common power control parameter.

14. The method according to claim 1, wherein the first common TCI state information is used for the at least one group of component carriers.

15. The method according to claim 14, wherein the first common TCI state information comprises or is associated with multiple power control parameter identifiers, each of the power control parameter identifiers corresponds to target units in one group of component carriers, or each of the power control parameter identifiers corresponds to one target unit in the at least one group of component carriers.

16. The method according to claim 14, wherein the first common TCI state information comprises or is associated with one power control parameter identifier, and target units of each group of component carriers correspond to the one power control parameter identifier.

17. The method according to claim 1, wherein the target power control parameter comprises:

a path loss reference signal (PLRS); and a power control parameter set other than the PLRS, wherein the power control parameter set other than the PLRS comprises at least one of the following: target received power, a path loss compensation factor, a closed loop index, or a power control adjustment state value.

18. The method according to claim 17, wherein the determining, by the communication device, a target power control parameter of each target unit in the first target component carrier group according to the first common TCI state information comprises:

in a case that the first common TCI state information does not comprise a first power control parameter identifier, and the first common TCI state information is not associated with the first power control parameter identifier, determining a quasi co-location typeD (QCL-typeD) reference signal of each target unit in the first target component carrier group according to the first common TCI information, and using the QCL-typeD reference signal of each target unit as the PLRS of the target unit; and/or in a case that the first common TCI state information does not comprise the first power control parameter identifier, and the first common TCI state information is not associated with the first power control parameter identifier, indicating by the network side device the power control parameter set other than the PLRS, or determining the power control parameter set other than the PLRS according to an agreement.

19. A communication device, comprising a processor, a memory, and a program or an instruction stored in the memory and executable on the processor, wherein the program or the instruction, when executed by the processor, causes the communication device to perform:

obtaining at least one group of component carriers configured by a network side device;

obtaining first common transmission configuration indicator (TCI) state information activated or indicated by the network side device for a first target component carrier group, wherein the first target component carrier group is a group of component carriers in the at least one group of component carriers; and determining, by the communication device, a target power control parameter of each target unit in the first target component carrier group according to the first common TCI state information, wherein a target unit comprises: a component carrier and/or a bandwidth part (BWP), and one component carrier comprises at least one BWP.

20. A non-transitory readable storage medium, storing a program or an instruction, wherein the program or the instruction, when executed by a processor of a communication device, causes the communication device to perform:

obtaining at least one group of component carriers configured by a network side device;

obtaining first common transmission configuration indicator (TCI) state information activated or indicated by the network side device for a first target component carrier group, wherein the first target component carrier group is a group of component carriers in the at least one group of component carriers; and determining, by the communication device, a target power control parameter of each target unit in the first target component carrier group according to the first common TCI state information, wherein a target unit comprises: a component carrier and/or a bandwidth part (BWP), and one component carrier comprises at least one BWP.

* * * * *